US008739167B2

(12) United States Patent
Zheng

(10) Patent No.: US 8,739,167 B2
(45) Date of Patent: May 27, 2014

(54) METHOD AND DEVICE FOR BALANCING LOAD OF MULTIPROCESSOR SYSTEM BY SEQUENCING MIGRATION PRIORITIES BASED ON MEMORY SIZE AND CALCULATED EXECUTION TIME

(75) Inventor: Han Zheng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 13/340,352

(22) Filed: Dec. 29, 2011

(65) Prior Publication Data

US 2012/0266175 A1    Oct. 18, 2012

Related U.S. Application Data

(63) Continuation of application No. PCT/CN2011/072913, filed on Apr. 18, 2011.

(51) Int. Cl.
*G06F 9/46* (2006.01)

(52) U.S. Cl.
USPC ........................... 718/103; 718/102; 718/105

(58) Field of Classification Search
CPC ....................................................... G06F 9/46
USPC ........................................ 718/102, 103, 105
See application file for complete search history.

(56) References Cited

U.S. PATENT DOCUMENTS

| 5,506,987 | A * | 4/1996 | Abramson et al. | ............. 718/103 |
| 2004/0010667 | A1 | 1/2004 | Brenner | |
| 2005/0188372 | A1 | 8/2005 | Inoue et al. | |
| 2008/0255895 | A1 * | 10/2008 | Rajamony et al. | ................. 705/7 |
| 2009/0019449 | A1 * | 1/2009 | Choi et al. | ..................... 718/105 |
| 2009/0178045 | A1 * | 7/2009 | Gupta et al. | .................. 718/103 |

FOREIGN PATENT DOCUMENTS

| CN | 1910554 A | 2/2007 |
| CN | 101446910 A | 6/2009 |
| WO | WO 2011/103825 A2 | 9/2011 |

OTHER PUBLICATIONS

International Search Report issued in corresponding PCT Patent Application No. PCT/CN2011/072913, mailed Jan. 12, 2012.
Extended European Search Report issued in corresponding European Patent Application No. 11746867.8, mailed Aug. 1, 2012.
Yagoubi et al., "Load Balancing Strategy in Grid Environment" Journal of Information Technology and Applications, vol. 1, No. 4, 2007.

(Continued)

*Primary Examiner* — Thomas Lee
*Assistant Examiner* — Terrell Johnson
(74) *Attorney, Agent, or Firm* — Brinks Gilson & Lione

(57) ABSTRACT

A method and a device for balancing load of a multiprocessor system relate to the resource allocation field of the multiprocessor system, for achieving the object of reducing the number of accessing a remote node memory or the amount of copying data when the processes migrated into a target Central Processing Unit (CPU) are performed. The method for balancing the load of the multiprocessor system includes: determining the local CPU and the target CPU in the multiprocessor system; sequencing the migration priorities, based on the size of memory space occupied by the processes in the queue of the local CPU; where the less the memory space occupied by the process is, the higher the migration priority of the process is; and migrating the process whose migration priority is the highest other than the processes being performed in the queue of the local CPU into the target CPU.

6 Claims, 3 Drawing Sheets

(56) References Cited

OTHER PUBLICATIONS

Barak et al., "Memory Ushering in a Scalable Computing Cluster" Microprocessors and Microsystems, vol. 22, 1998.

Sanlaville, "Robust Approaches for Scheduling Under Uncertainties: the RobOCoop Project and Its Relevance for Grid Computing" Jun. 2009.

\* cited by examiner

METHOD AND DEVICE FOR BALANCING LOAD OF MULTIPROCESSOR SYSTEM BY SEQUENCING MIGRATION PRIORITIES BASED ON MEMORY SIZE AND CALCULATED EXECUTION TIME

CROSS-REFERENCE TO RELATED APPLICATIONS

This application is a continuation of International Application No. PCT/CN2011/072913, filed on Apr. 18, 2011, which is hereby incorporated by reference in its entirety.

FIELD OF THE INVENTION

The present invention relates to the resource allocation field of a multiprocessor system, and particularly, to a method and a device for balancing load of a multiprocessor system.

BACKGROUND OF THE INVENTION

In a multiprocessor system, each CPU (Central Processing Unit) individually maintains a queue, thus the loads of multiple CPUs are unbalanced, and processes (or threads) are required to be migrated from the CPU with a large load into the CPU with a small load to balance the loads, wherein the CPU from which the processes are migrated is referred to as the local CPU, and the CPU into which the processes are migrated is referred to as the target CPU.

In the prior art, a method for balancing load by migrating processes based on the condition of being cold or hot of the processes in the cache is provided, specifically including: firstly, setting a threshold (the maximum value) for the waiting time of processes, the waiting time of a process refers to the time interval from a moment at which whether or not to migrate the process is judged to a moment at which the latest execution of the process is ended; next, judging whether the waiting time of a process in the local CPU is larger than the threshold; if yes, deeming that the process is cold in the cache, and migrating the process into the target CPU; if no, deeming that the process is hot in the cache and not migrating the process. On each CPU, the above method is circularly utilized to migrate processes, until a certain load balance is achieved among the CPUs.

Although the effect of balancing loads can be achieved by utilizing the above method, some processes occupying a large memory space may be migrated into the target CPU. Thus, when being executed on the target CPU, these processes need to access the remote node memory for a number of times, or need to copy a large amount of data relevant to the processes from the remote node memory to the local node memory, thereby influencing the performance of the system.

SUMMARY OF THE INVENTION

The embodiments of the present invention provide a method and a device for balancing load of a multiprocessor system, for achieving the object of reducing the number of accessing a remote node memory or the amount of copying data when the processes migrated into a target CPU are performed.

In order to achieve the above object, the embodiments of the present invention adopt the following technical solutions:

A method for balancing load of a multiprocessor system, including:
  determining a local Central Processing Unit (CPU) and a target CPU in the multiprocessor system;
  sequencing migration priorities of processes in the queue of the local CPU, based on the size of memory space occupied by the processes in the queue of the local CPU, wherein the less the memory space a process occupies is, the higher the migration priority of the process is; and
  migrating a process whose migration priority is the highest among the processes in the queue of the local CPU other than a process being performed into the target CPU.

A device for balancing load of a multiprocessor system, comprising:
  a determination unit configured to determine a local Central Processing Unit (CPU) and a target CPU in the multiprocessor system;
  a sequencing unit configured to sequence migration priorities of processes in the queue of the local CPU, based on the size of memory space occupied by the processes in the queue of the local CPU, wherein the less the memory space a process occupies is, the higher the migration priority of the process is; and
  a migration unit configured to migrate a process whose migration priority is the highest among the processes in the queue of the local CPU other than a process being performed into the target CPU.

The method and device for balancing load of a multiprocessor system according to the embodiments of the present invention sequence the migration priorities, based on the size of memory space occupied by the processes in the queue of the local CPU, and migrate the process whose migration priority is the highest among the processes in the queue of the local CPU other than the processes being performed into the target CPU. Since the smaller the memory space a process occupies is, the higher the migration priority of the process is, the process occupying the minimum memory space in the queue of the local CPU can be preferably migrated into the target CPU, thereby reducing the number of accessing the remote node memory or the amount of copying data when the migrated process is performed on the target CPU.

BRIEF DESCRIPTION OF THE DRAWINGS

In order to more clearly describe the technical solutions in the embodiments of the present invention or the prior art, the drawings required to be used in the descriptions of the embodiments or the prior art will be briefly introduced below. Obviously, the drawings in the following description just illustrate some embodiments of the present invention, and a person skilled in the art can obtain other drawings from these drawings as well without paying any creative effort.

DETAILED DESCRIPTION OF THE EMBODIMENTS

A multiprocessor system refers to a system provided with at least two CPUs for data processing. For example, the NUMA (Non Uniform Memory Access) Architecture system is a multiprocessor system, and the CPUs in all the nodes of the system can access all physical memories of the system. Meanwhile, the delays of the CPU in a node assessing the memories of other different nodes are different from each other. The solutions provided by the present invention can be applicable to the multiprocessor system of NUMA Architecture.

The technical solutions in the embodiments of the present invention will be clearly and completely described below in conjunction with the appended drawings in the embodiments of the present invention. Obviously, the described embodiments are just part of the embodiments of the present invention rather than all the embodiments. Based on the embodiments of the present invention, all other embodiments obtained by a person skilled in the art without paying any creative effort shall fall within the protection scope of the present invention.

Figure 1:
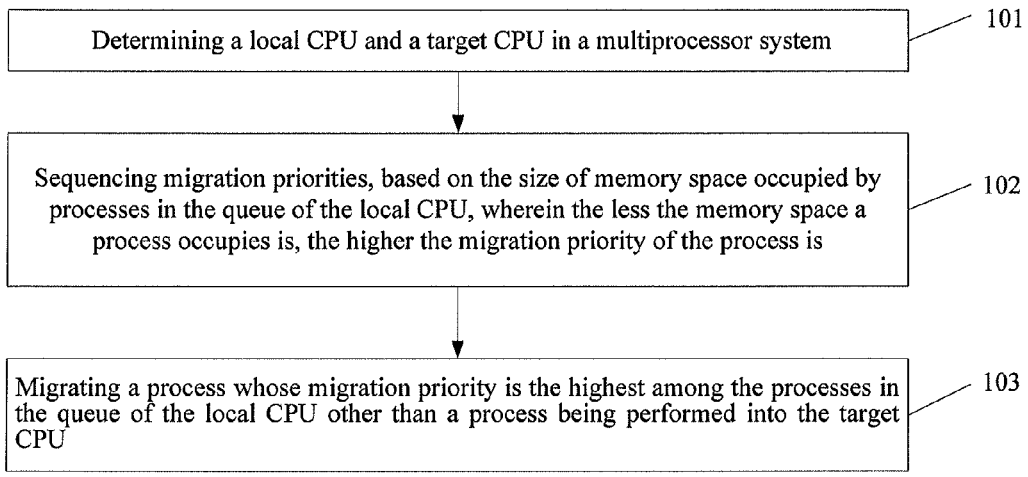
FIG. 1 illustrates a schematic diagram for a method for balancing load of a multiprocessor system according to Embodiment 1.

Embodiment 1:

As illustrated in FIG. 1, the embodiment of the present invention provides a method for balancing load of a multiprocessor system, including:

Step 101: determining a local CPU and a target CPU in a multiprocessor system.

For a multiprocessor system, whether the load of the multiprocessor system is unbalanced shall be detected each time the clock is interrupted, and if the load of the multiprocessor system is unbalanced, performing a load balance processing is required. The load balance processing refers to migrating processes from the CPU with a large load into the CPU with a small load, wherein the CPU from which processes are migrated is referred to as the local CPU, and the CPU into which the processes are migrated is referred to as the target CPU. Generally, the CPU with a large load can serve as the local CPU, and the CPU with a small load can serve as the target CPU.

Step 102: sequencing migration priorities, based on the size of memory space occupied by processes in the queue of the local CPU, wherein the less the memory space a process occupies is, the higher the migration priority of the process is.

The migration priority is used to represent the priority order of the process migration; that is, the higher the migration priority of a process is, the more preferentially the process shall be migrated.

This step can be reading the sizes of memory spaces all the processes in the queue of the local CPU occupy, and sequencing the migration priorities based on the size of memory space each process occupies, wherein the less the memory space a process occupies is, the higher the migration priority of the process is.

In which, reading the sizes of memory spaces occupied by all the processes in the queue of the local CPU can utilize the following method: obtaining the size of memory space any process in the local queue occupies by checking the corresponding page table attribute.

Step 103: migrating a process whose migration priority is the highest among the processes in the queue of the local CPU other than a process being performed into the target CPU.

The above three steps can be performed circularly until the multiprocessor system reaches or approaches a load balance, or achieves the load conditions of respective CPUs required by the application environment.

To be noted, the execution entity for each of the above steps is a device for balancing load of a multiprocessor system, and the device can be a functional module based on the multiprocessor system. In addition, the functional module can be disposed in each of the CPUs, or disposed independently from each of the CPUs.

The method for balancing load of the multiprocessor system according to the embodiment of the present invention migrates the process occupying the minimum memory space other than the processes being performed in the queue of the local CPU into the target CPU, thereby reducing the number of accessing the remote node memory or the amount of copying data when the migrated process is performed on the target CPU.

Embodiment 2:

Taking into account some application environments or scenes, the multiprocessor system shall meet the load requirements of some application environments or scenes. The method for balancing load of the multiprocessor system according to the embodiment of the present invention presets a threshold for the migration priorities according to the load requirements to the multiprocessor system under the application environments or scenes.

Figure 2:
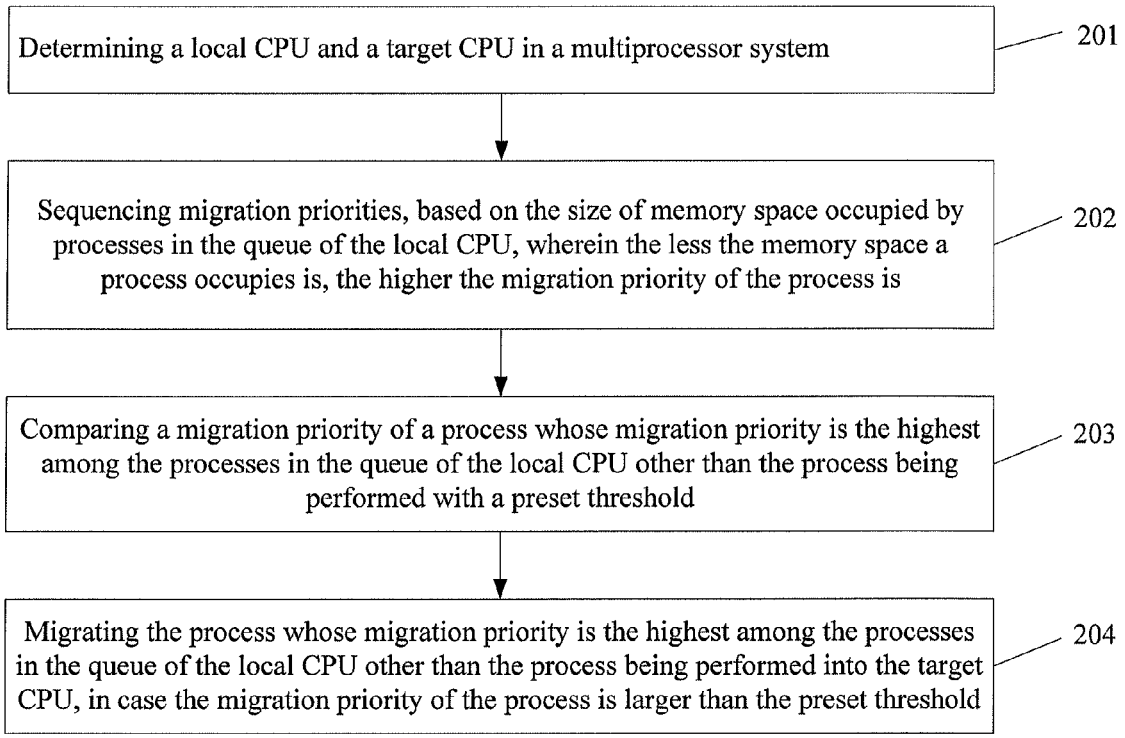
FIG. 2 illustrates a schematic diagram for a method for balancing load of a multiprocessor system according to Embodiment 2.

As illustrated in FIG. 2, the method for balancing load of a multiprocessor system according to the embodiment of the present invention includes:

Step 201: determining a local CPU and a target CPU in a multiprocessor system.

It can refer to step 101.

Step 202: sequencing migration priorities, based on the size of memory space occupied by processes in the queue of the local CPU, wherein the less the memory space a process occupies is, the higher the migration priority of the process is.

The explanation to this step can refer to step 102. In addition, the migration priorities can be represented with numerals, i.e., the magnitudes of the numerals are used to represent the order of the migration priorities. In this embodiment, the larger the numeral is, the higher the migration priority is. For example, when the queue of the local CPU has nine processes, the migration priorities of the nine processes can be represented with numerals 1-9 based on the sizes of memory spaces the nine processes occupy, and the process whose migration priority is 9 occupies the minimum memory space. In case two of the nine processes occupy memory space with the same size, the migration priorities of the two processes can be interchanged. For example, when two processes with the highest migration priority occupy memory space with the same size, the migration priorities of the two processes are marked as 8 and 9, respectively, but the migration priority of either of the two processes can be randomly set as 8 or 9. Of course, the level of the migration priorities of the two processes can also be further distinguished through other judgment means.

Step 203: comparing a migration priority of a process whose migration priority is the highest among the processes in the queue of the local CPU other than the process being performed with a preset threshold.

According to the application environment or scene of the multiprocessor system, a threshold is preset for the migration priorities of the processes in the queue of the local CPU (i.e., the maximum value of the migration priority of the process that can be migrated). After the comparison of this step, if the migration priority of the process whose migration priority is the highest is larger than the preset threshold, the process shall be migrated; otherwise, the process shall not be migrated.

For example in this embodiment, when the migration priority of the process being performed in the queue of the local CPU is 5 and the preset threshold is 7, according to this step, the migration priority 9 of the process whose migration priority is the highest is compared with the preset threshold 7. Obviously, 9 is larger than 7, and the process whose migration priority is 9 is not a process that is being performed, thus step 204 is performed.

Step 204: migrating the process whose migration priority is the highest among the processes in the queue of the local CPU other than the process being performed into the target CPU, in case the migration priority of the process is larger than the preset threshold.

For example, when the migration priority of the process whose migration priority is the highest in the queue of the local CPU is 9, the process is not a process that is being performed, and 9 is larger than the preset threshold 7, the process is migrated into the target CPU in this step. When the process whose migration priority is 9 in the queue of the local CPU is being performed, the process whose migration priority is 8 shall be the process whose migration priority is the highest other than the process being performed. Since 8 is larger than the preset threshold 7, the process whose migration priority is 8 in the queue of the local CPU is migrated into the target CPU. After the process whose migration priority is 8 in the queue of the local CPU is migrated into the target CPU, it is judged whether the load of the multiprocessor system is balanced. If yes, the flow ends, otherwise, steps 201-204 will be circularly performed.

The method according to this embodiment of the present invention presets a threshold for the migration priorities according to the application environment or scene of the multiprocessor system, so that the multiprocessor system reaches the load balance as far as possible while meeting the load requirement to each CPU under the application environment or scene. As the migrated processes are processes occupying a small memory space, the number of accessing the remote node memory or the amount of copying data when the migrated processes are performed on the target CPU can be reduced.

Figure 3:
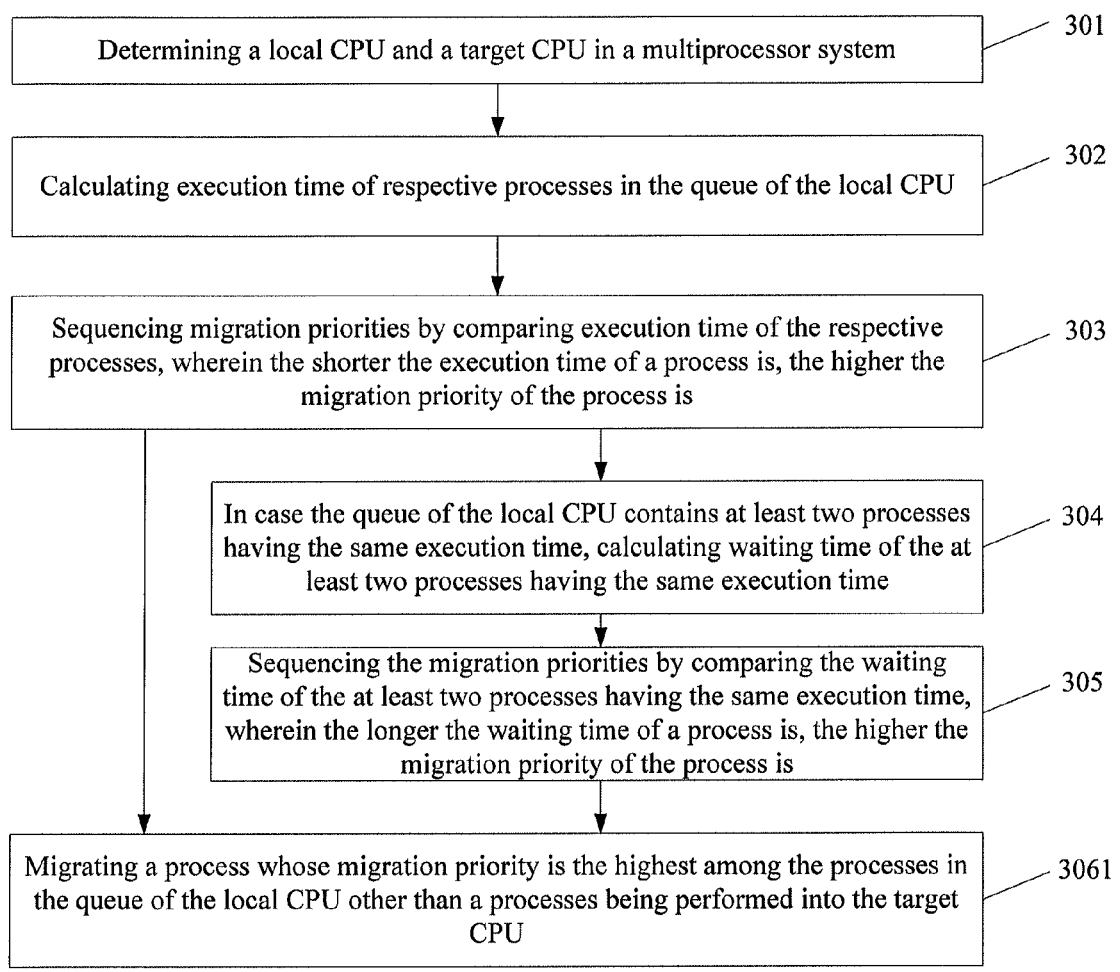
FIG. 3 illustrates a schematic diagram for a method for balancing load of a multiprocessor system according to Embodiment 3.

Embodiment 3:

As the execution time of a process can reflect the size of the memory space occupied by the process at a certain extent, generally, there is a positive functional relation between the execution time of the process and the size of the memory space occupied by the process, i.e., the longer the execution time of the process is, the larger the memory space the process occupies is. The execution time of the process refers to the time consumed from the start to the end of the process execution. Based on the above consideration, as illustrated in FIG. 3, this embodiment of the present invention provides another method for balancing load of a multiprocessor system.

Step 301: determining a local CPU and a target CPU in a multiprocessor system.

It can refer to step 101.

Step 302: calculating execution time of respective processes in the queue of the local CPU.

For example, when there are nine processes in the queue of the local CPU, the execution time of each of the nine processes can be calculated by subtracting the moment at which a process is started from the moment at which the process is ended to obtain the execution time of the process, or using a timer.

Step 303: sequencing migration priorities by comparing execution time of the respective processes, wherein the shorter the execution time of a process is, the higher the migration priority of the process is.

In this embodiment, the magnitudes of the numerals can be used to represent the order of migration priorities. For example, this step can be comparing the duration of the execution time of the nine processes in the queue of the local CPU, and representing the migration priorities of the nine processes with numerals 1-9, i.e., sequencing the migration priorities. The shorter the execution time of a process is, the higher the migration priority of the process is. The migration priority of the process whose execution time is the shortest is marked as 9, and the migration priority of the process whose execution time is the longest is marked as 1.

In case the execution time of the nine processes in the queue of the local CPU is different from each other, step 306 shall be further performed.

In case the queue of the local CPU contains at least two processes having the same execution time, the migration priorities of the at least two processes having the same execution time can be randomly set. For example, when three processes whose migration priorities are 5, 6, 7 have the same execution time, the migration priorities of the three processes can be randomly marked as 5, 6, 7. Of course, the migration priorities of the at least two processes having the same execution time can be further judged through steps 304-305.

Step 304: in case the queue of the local CPU contains at least two processes having the same execution time, calculating waiting time of the at least two processes having the same execution time.

The waiting time of a process refers to the elapsed time from the moment at which the last execution of the process in the local CPU is ended to the moment at which this step is performed. The waiting time of the process can be calculated by subtracting the moment at which the last execution of the process in the local CPU is ended from the moment at which this step is performed, or using a timer. Of course, other methods capable of acquiring the waiting time of the process are not excluded.

For example, when three processes whose migration priorities are 5, 6, 7 in the local CPU have the same execution time, the waiting time of the three processes shall be calculated, respectively.

Step 305: sequencing the migration priorities by comparing the waiting time of the at least two processes having the same execution time, wherein the longer the waiting time of a process is, the higher the migration priority of the process is.

For example, the migration priorities are sequenced by comparing the duration of the waiting time of three processes whose migration priorities are 5, 6, 7 in the local CPU. The longer the waiting time of a process is, the longer the time from the moment at which the last execution of the process is ended is, and the higher the migration priority of the process is. On the contrary, the shorter the waiting time of a process is, the shorter the time from the moment at which the last execution of the process is ended is, and the lower the migration priority of the process is. According to this sequencing method, the migration priorities of the processes having the same execution time are sequenced.

Figure 4:
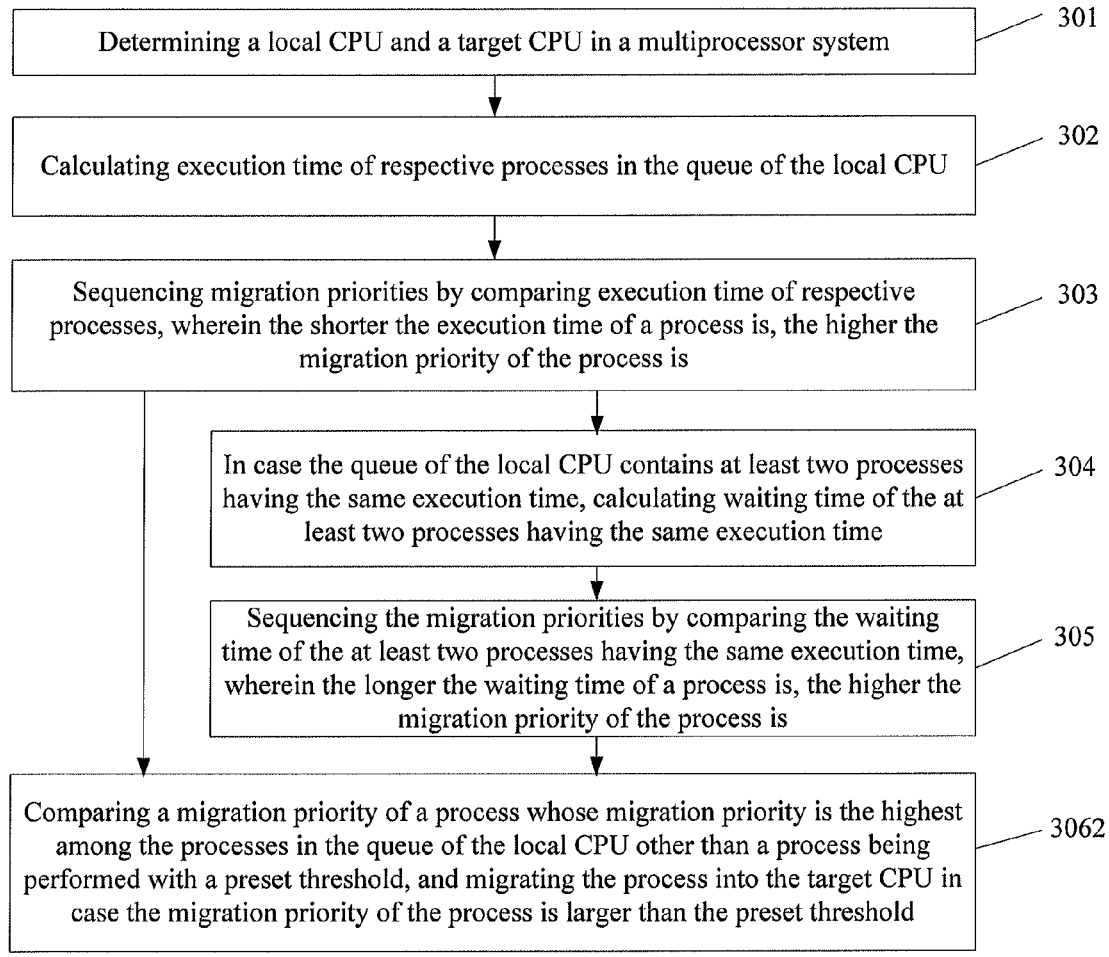
FIG. 4 illustrates a schematic diagram for another method for balancing load of a multiprocessor system according to Embodiment 3.

Through the above steps, the process whose migration priority is the highest other than the processes being performed in the queue of the local CPU can be obtained. Next, step 3061 is performed when only taking into account balancing the load of the multiprocessor system, as illustrated in FIG. 3; a threshold needs to be preset for the migration priorities according to the load requirement to the multiprocessor system under the application environment or scene when taking into account the load requirement, and step 3062 is performed, as illustrated in FIG. 4.

Step 3061: migrating a process whose migration priority is the highest among the processes in the queue of the local CPU other than a processes being performed into the target CPU.

The flow ends when the load of the multiprocessor system is balanced at that time; when the load of the multiprocessor system is still unbalanced at that time, steps 301-3061 as illustrated in FIG. 3 are circularly performed until the load is balanced.

The method according to the embodiment of the present invention estimates the size of memory space occupied by a process based on the execution time of the process, and migrates the process whose execution time is the shortest other than the processes being performed in the local CPU into the target CPU until the load of the multiprocessor system is balanced, thereby reducing the number of accessing the remote node memory or the amount of copying data when the migrated process is performed on the target CPU.

Step 3062: comparing a migration priority of a process whose migration priority is the highest among the processes in the queue of the local CPU other than a process being performed with a preset threshold, and migrating the process into the target CPU in case the migration priority of the process is larger than the preset threshold.

S1: comparing the migration priority of the process whose migration priority is the highest among the processes in the queue of the local CPU other than the process being performed with a preset threshold;

S2: migrating the process whose migration priority is the highest among the processes in the queue of the local CPU other than the processes being performed into the target CPU in case the migration priority of the process is larger than the preset threshold.

The flow ends when the load of the multiprocessor system is balanced at that time;

when the load of the multiprocessor system is still unbalanced at that time, steps 301-3062 as illustrated in FIG. 4 are circularly performed, so that the multiprocessor system reaches the load balance as far as possible while meeting the load requirement under the application environment or scene.

This embodiment of the present invention considers reaching the load balance of the multiprocessor system as far as possible under the application environment or scene of the multiprocessor system. As the migrated processes are processes occupying a small memory space, the number of accessing the remote node memory or the amount of copying data when the migrated processes are performed on the target CPU can be reduced.

Figure 5:
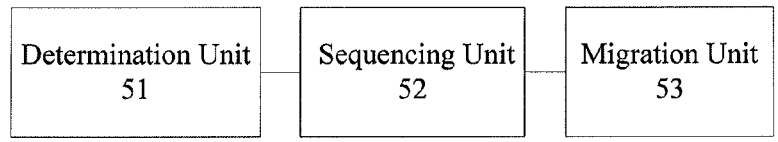
FIG. 5 illustrates a block diagram for a device for balancing load of a multiprocessor system according to an embodiment of the present invention.

The embodiment of the present invention further provides a device corresponding to the method for balancing load of the multiprocessor system. As illustrated in FIG. 5, the device including:

a determination unit 51 configured to determine a local CPU and a target CPU in the multiprocessor system;

a sequencing unit 52 configured to sequence migration priorities, based on the size of memory space occupied by processes in the queue of the local CPU, wherein the less the memory space a process occupies is, the higher the migration priority of the process is; and a migration unit 53 configured to migrate a process whose migration priority is the highest among the processes in the queue of the local CPU other than a process being performed into the target CPU.

The device for balancing load of the multiprocessor system according to this embodiment of the present invention migrates the process occupying the minimum memory space other than the processes being performed in the queue of the local CPU into the target CPU, thereby reducing the number of accessing the remote node memory or the amount of copying data when the migrated process is performed on the target CPU.

Preferably, the sequencing unit 52 includes:

a first calculation subunit configured to calculate execution time of respective processes in the queue of the local CPU; and a first comparison subunit configured to sequence the migration priorities by comparing the execution time of the respective processes, wherein the shorter the execution time of a process is, the higher the migration priority of the process is.

In case the queue of the local CPU contains at least two processes having the same execution time, the sequencing unit 52 can further include:

a second calculation subunit configured to calculate, in case the queue of the local CPU contains at least two processes having the same execution time, waiting time of the at least two processes having the same execution time; and a second comparison subunit configured to sequence the migration priorities by comparing the waiting time of the at least two processes having the same execution time, wherein the longer the waiting time of a process is, the higher the migration priority of the process is.

Figure 6:
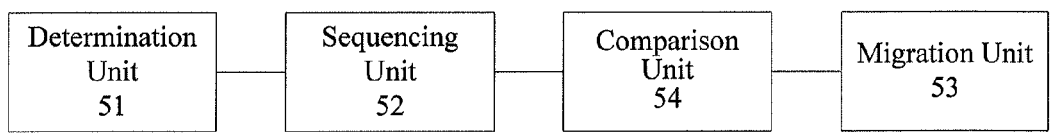
FIG. 6 illustrates a block diagram for a device for balancing load of a multiprocessor system according to another embodiment of the present invention.

Further, when taking into account the requirement of some application environments or scenes to the multiprocessor system, a threshold needs to be preset for the migration priorities. As illustrated in FIG. 6, the above device further includes:

a comparison unit 54 configured to compare the migration priority of the process whose migration priority is the highest among the processes in the queue of the local CPU other than the process being performed with a preset threshold, wherein the migration priority is represented with a numeral. In that case, the migration unit 53 is configured to migrate the process whose migration priority is the highest among the processes in the queue of the local CPU other than the process being performed into the target CPU, in case the migration priority of the process is larger than the preset threshold.

Through the comparison unit 54, the multiprocessor system can reach the load balance as far as possible while meeting the load requirement of some application environments or scenes. As the migrated processes are processes occupying a small memory space, the number of accessing the remote node memory or the amount of copying data when the migrated processes are performed on the target CPU can be reduced.

From the above description of the embodiments, a person skilled in the art can clearly understand that the present invention can be implemented by means of the form of software in combination with necessary general hardware, and of course the present invention can also be implemented by means of hardware, but the former is a more preferable embodiment in many cases. Based on such understanding, the substance of the technical solutions of the present invention or the part thereof contributing to the prior art can be embodied in the form of a software product. The computer software product is stored in a readable storage medium, e.g., floppy disk, hard disk, optical disk or the like of the computer, including several instructions for enabling a computer equipment (such as personal computer, server, network facility, etc.) to execute the method according to each of the embodiments of the present invention.

The above description just concerns the specific embodiments of the present invention, and the protection scope of the present invention is not limited thereto. Any change or replacement that can be easily conceived of by a person skilled in the art within the technique scope disclosed by the present invention shall be covered by the protection scope of the present invention. Therefore, the protection scope of the present invention shall be determined by that of the claims.

What is claimed is:

1. A method for balancing load of a multiprocessor system, characterized by comprising:
   determining a local Central Processing Unit (CPU) and a target CPU in the multiprocessor system;
   sequencing migration priorities of processes in the queue of the local CPU, based on the size of memory space occupied by the processes in the queue of the local CPU, wherein the less the memory space a process occupies is, the higher the migration priority of the process is; and
   migrating a process whose migration priority is the highest among the processes in the queue of the local CPU other than a process being performed into the target CPU,
   wherein sequencing migration priorities of processes in the queue of the local CPU, based on the size of memory space occupied by the processes in the queue of the local CPU, wherein the less the memory space a process occupies is, the higher the migration priority of the process is comprises:
   calculating execution time of respective processes in the queue of the local CPU; and
   sequencing the migration priorities by comparing the execution time of the respective processes, wherein the shorter the execution time of a process is, the higher the migration priority of the process is.

2. The method according to claim 1, further comprising: comparing the migration priority of the process whose migration priority is the highest among the processes in the queue of the local CPU other than the process being performed with a preset threshold, wherein the migration priority is represented with a numeral, and the larger the numeral is, the higher the migration priority is;
   wherein migrating a process whose migration priority is the highest among processes in the queue of the local CPU other than a process being performed into the target CPU is specified as:
   migrating the process whose migration priority is the highest among the processes in the queue of the local CPU other than the process being performed into the target CPU, in case the migration priority of the process is larger than the preset threshold.

3. The method according to claim 1, wherein sequencing migration priorities of processes in the queue of the local CPU, based on the size of memory space occupied by the processes in the queue of the local CPU, wherein the less the memory space a process occupies is, the higher the migration priority of the process is further comprises:
   in case the queue of the local CPU contains at least two processes having the same execution time, calculating waiting time of the at least two processes having the same execution time; and
   sequencing the migration priorities by comparing the waiting time of the at least two processes having the same execution time, wherein the longer the waiting time of a process is, the higher the migration priority of the process is.

4. A device for balancing load of a multiprocessor system, comprising:
   a determination unit configured to determine a local Central Processing Unit (CPU) and a target CPU in the multiprocessor system;
   a sequencing unit configured to sequence migration priorities of processes in the queue of the local CPU, based on the size of memory space occupied by the processes in the queue of the local CPU, wherein the less the memory space a process occupies is, the higher the migration priority of the process is; and
   a migration unit configured to migrate a process whose migration priority is the highest among the processes in the queue of the local CPU other than a process being performed into the target CPU,
   wherein the sequencing unit comprises:
   a first calculation subunit configured to calculate execution time of respective processes in the queue of the local CPU; and
   a first comparison subunit configured to sequence the migration priorities by comparing the execution time of the respective processes, wherein the shorter the execution time of a process is, the higher the migration priority of the process is.

5. The device according to claim 4, further comprising:
   a comparison unit configured to compare the migration priority of the process whose migration priority is the highest among the processes in the queue of the local CPU other than the processes being performed with a preset threshold, wherein the migration priority is represented with a numeral; and
   the migration unit is configured to migrate the process whose migration priority is the highest among the processes in the queue of the local CPU other than the processes being performed into the target CPU, in case the migration priority of the process is larger than the preset threshold.

6. The device according to claim 4, wherein the sequencing unit further comprises:
   a second calculation subunit configured to calculate, in case the queue of the local CPU contains at least two processes having the same execution time, waiting time of the at least two processes having the same execution time; and
   a second comparison subunit configured to sequence the migration priorities by comparing the waiting time of the at least two processes having the same execution time, wherein the longer the waiting time of a process is, the higher the migration priority of the process is.

* * * * *